US006951898B2

(12) United States Patent
Hammond et al.

(10) Patent No.: US 6,951,898 B2
(45) Date of Patent: Oct. 4, 2005

(54) CYCLOOLEFIN COPOLYMER RESINS HAVING IMPROVED OPTICAL PROPERTIES

(75) Inventors: Douglas A. Hammond, Glendale, CA (US); Dirk Heukelbach, Weiterstadt (DE)

(73) Assignee: Ticona LLC, Summit, NJ (US)

( * ) Notice: Subject to any disclaimer, the term of this patent is extended or adjusted under 35 U.S.C. 154(b) by 134 days.

(21) Appl. No.: 10/016,334

(22) Filed: Dec. 10, 2001

(65) Prior Publication Data

US 2003/0149148 A1 Aug. 7, 2003

(51) Int. Cl.[7] .......................... C08K 5/103; C08L 45/00

(52) U.S. Cl. ....................... 524/291; 524/321; 524/322; 525/210

(58) Field of Search ................................ 524/291, 321, 524/322; 525/210

(56) References Cited

U.S. PATENT DOCUMENTS 4,874,808 A 10/1989 Minami et al. ............. 524/291
5,270,393 A * 12/1993 Sagane et al. .............. 525/210
5,439,722 A 8/1995 Brekner et al. ............ 428/65.1
5,965,665 A * 10/1999 Fukuyama et al. ........... 525/65

* cited by examiner

*Primary Examiner*—Tae H. Yoon
(74) *Attorney, Agent, or Firm*—Michael W. Ferrell

(57) ABSTRACT

A cycloolefin copolymer resin having a Hunter b color value of less than 1.0, which resin comprises:

(a) a first cycloolefin copolymer having a glass transition temperature of from about 100° C. to about 220° C. and an intrinsic viscosity of from about 5 to about 1000 ml/g as measured in decalin at 135° C., (b) up to about 10% by weight, based on the total weight of the resin, of a second cycloolefin copolymer, said second copolymer having a glass transition temperature of greater than about 50° C. and an intrinsic viscosity of from about 1 to about 500 ml/g as measured in decalin at 135° C., and (c) from about 0.01% to about 3%, based on the total weight of the resin, of at least one lubricant selected from the group consisting of fatty acid esters of aliphatic polyhydric alcohols, with the proviso that the glass temperature of the second cycloolefin copolymer is at least 25° C. lower than the glass transition temperature of the first cycloolefin copolymer, said resin being suitable for use in precision optical applications.

18 Claims, No Drawings

CYCLOOLEFIN COPOLYMER RESINS HAVING IMPROVED OPTICAL PROPERTIES

BACKGROUND OF THE INVENTION

1. Field of the Invention

The field of art to which this invention relates is cycloolefin copolymer (COC) resins for use in precision optical applications.

2. Description of the Prior Art

Resins comprising one or more cycloolefin copolymers have been disclosed for use in a variety of optical applications, including, for example, optical or compact disks, information recording films and base boards, optical fibers, and the like. U.S. Pat. No. 5,439,722, for example, discloses a cycloolefin copolymer comprising at least one cycloolefin copolymer for recording media, wherein the cycloolefin copolymer has a molar-mass distribution $M_w/M_n$<about 2, a molecular weight of less than/equal to about 30,000 g/mole and a glass transition temperature of from about 100° C. to 200° C. Also disclosed in U.S. Pat. No. 5,439,722 are blends of two or more COCs.

COC compositions for use in information recording films and information recording baseboards are disclosed in U.S. Pat. No. 4,874,808. More particularly, the patent discloses compositions comprising (A) a cycloolefin type random copolymer containing an ethylene component and a cycloolefin component represented by the general formula

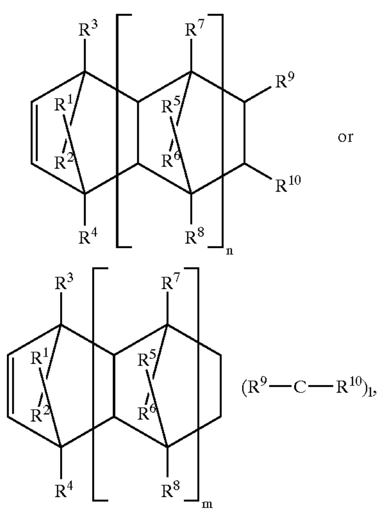

wherein n and m are each 0 or a positive integer, I is an integer of at least 3, $R^1$ to $R^{10}$ each represent a hydrogen atom, halogen atom or hydrocarbon group, wherein said cycloolefin type random copolymer (A) has an intrinsic viscosity of 0.05–10 dl/g as measured at 135° C. in decalin and a softening temperature of not lower than 70° C. and (B) a cycloolefin type random copolymer containing an ethylene component and a cycloolefin component represented by either of the aforesaid general formulas, wherein said cycloolefin type random copolymer (B) has an intrinsic viscosity of 0.01–5 dl/g as measured at 135° C. in decalin and a softening temperature of below 70° C., wherein the weight ratio of component (A) to component (B) ranges from 100/0.1 to 100/10. The combination of component (A) and component (B) is disclosed as providing compositions having improved adhesion. The patent also discloses that, in addition to the cycloolefin type random copolymer (A) and the cycloolefin type random copolymer (B), the composition may contain stabilizers such as phenolic antioxidants, metallic salts of fatty acids, and fatty esters of polyhydric alcohols. At column 15, lines 3 to 19, it is stated that " . . . phenolic antioxidants as illustrated above are used in an amount of 0.01–10 parts by weight, preferably 0.05–3 parts by weight based on 100 parts by weight of the cycloolefin type random copolymer composition. Similarly, the fatty esters of polyhydric alcohol are used in an amount of 0.01–10 parts by weight, preferably 0.05–3 parts by weight based on 100 parts by weight of the said compositions."

U.S. Pat. No. 4,874,808 specifically exemplifies compositions containing a cycloolefin copolymer (A) having a softening temperature ranging from 153° C. to 155° C., a cycloolefin copolymer (B) having a softening temperature ranging from 39° C. to 45° C.), 0.5% of tetrakis[methylene-3-(3,5-di-t-butyl-4-hydroxyphenyl)propionate]methane (a phenolic antioxidant), 0.05% of zinc stearate and 0.5% of glycerin monostearate, said amounts of phenolic antioxidant, zinc stearate, and glycerin monostearate being based on the total weight of the COC components (A) and (B). The patent reported adhesion and transparency data, but not silver streaking and color hue data for these compositions.

U.S. Pat. No. 4,874,808 further exemplifies compositions containing a single cycloolefin type random copolymer, 0.05% by weight of zinc stearate, 0.6% by weight of a phenolic antioxidant, and 0.6 to 9.6% by weight of a fatty ester of a polyhydric alcohol, which was either partially esterified, as in the case of Examples 16 to 18, or completely esterified, as in the case of Example 21. Example 19 of the patent exemplifies a composition containing a single cycloolefin type random copolymer, 0.6% by weight of a phenolic antioxidant and 0.05% by weight of zinc stearate; Example 22 exemplifies a composition containing a single cycloolefin type random copolymer, a partially esterified fatty ester of a polyhydric alcohol and zinc stearate. Molded specimens made from the compositions containing the single cycloolefin type random copolymer were evaluated for properties that included color hue (b value) and the formation of silver streaks. Specimens made from the compositions that contained the phenolic antioxidant, a partially esterified fatty ester of a polyhydric alcohol and zinc stearate (i.e., the compositions of Examples 16 to 18) exhibited less silver streaking and yellowing, as a function of the color hue value "b", than specimens made from the compositions which lacked the antioxidant (i.e., the composition of Example 22) or specimens made from the compositions which lacked the fatty acid ester of the polyhydric alcohol (i.e., the composition of Example 19) or specimens that contained a completely esterified fatty acid ester of a polyhydric alcohol (i.e., the composition of Example 21). In particular, specimens made from the compositions of Examples 16 to 18 had color hue (b values) ranging from 1.0 to 1.2; in contrast, specimens made from the compositions of Examples 19, 21 and 22 had b values ranging from 3.0 to 5.0.

For optical applications requiring extreme clarity it is desirable to minimize silver streaking, and yellowing. On the Hunter color scale, yellowing is represented by the Hunter b color value. For precision optical applications, such as for example, optical display base boards, light enhancing plates, precision lenses light emitting diodes, light guides, and the like, cycloolefin copolymer resins having Hunter b color values of less than 1.0 are desired. Throughout the remainder of the specification and claims, "Hunter b color value" refers to the b value of a material tested in accordance with the "Hunter Color Test Procedure" set forth below.

SUMMARY OF THE INVENTION

It has now been found that the yellowing of a cycloolefin copolymer resin comprising a first cycloolefin copolymer having a glass transition temperature ($T_g$) of from about 100° C. to about 220° C., may be reduced by incorporating therein a fatty acid ester of a polyhydric alcohol and up to about 10% by weight of a second cycloolefin copolymer having a $T_g$ greater than about 50° C., but at least about 25° C. lower than that of the first cycloolefin copolymer. The resulting resin is also found to have reduced silver streaking (also termed splaying) and haze. Accordingly, in one embodiment this invention relates to a cycloolefin copolymer resin having a Hunter b color value of less than 1.0, which resin comprises:

(a) a first cycloolefin copolymer having a glass transition temperature of from about 100° C. to about 220° C. and an intrinsic viscosity of from about 5 to about 1000 ml/g as measured in decalin at 135° C., (b) up to about 10% by weight, based on the total weight of the resin, of a second cycloolefin copolymer, said second cycloolefin copolymer having a glass transition temperature of greater than about 50° C. and an intrinsic viscosity of from about 1 to about 500 ml/g as measured in decalin at 135° C., and (c) from about 0.01% to about 3% by weight, based on the total weight of the resin, of at least one lubricant selected from the group consisting of fatty acid esters of aliphatic polyhydric alcohols, with the proviso that the glass temperature of the second cycloolefin copolymer is at least 25° C. lower than the glass transition temperature of the first cycloolefin copolymer.

DESCRIPTION OF THE INVENTION

The cycloolefin copolymers used in the practice of the subject invention are random copolymers comprising units derived from (a) at least one cycloolefin selected from the group consisting of:

(I)

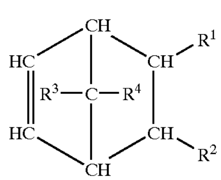

(II)

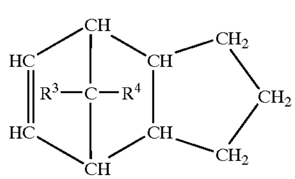

(III)

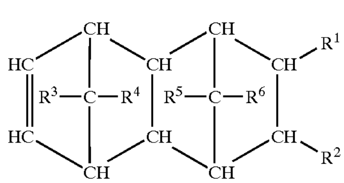

-continued (IV)

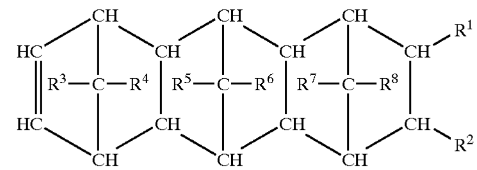

(V)

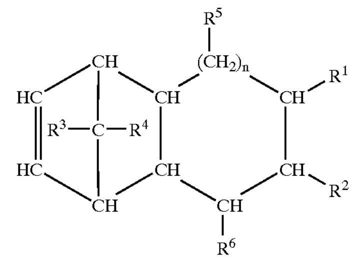

and (VI)

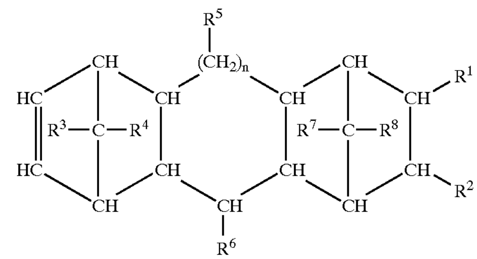

wherein $R^1$, $R^2$, $R^3$, $R^4$, $R^5$, $R^6$, $R^7$, and $R^8$ are independently selected from hydrogen, $C_1$ to $C_{20}$ alkyl groups, $C_6$ to $C_{20}$ aryl groups, F, Cl, Br, and I, and n is an integer having a value from 0 to 5; (b) an non cyclic 1-olefin of the formula:

(VII)

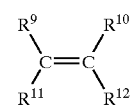

wherein $R^9$ to $R^{12}$ are independently selected from hydrogen and $C_1$ to $C_8$ alkyl groups; and, optionally, (c) a cycloolefin of the formula:

(VIII)

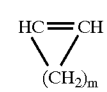

wherein m is an integer having a value from 2 to 10. In the practice of this invention cycloolefin copolymer comprising units derived from ethylene and a formula I cycloolefin are of particular interest.

The first cycloolefin copolymer has a glass transition temperature of from about 100° C. to about 220° C., with copolymers having glass transition temperatures of from about 100° C. to about 185° C., more particularly from about 100° C. to about 160° C., being of special interest owing to their ability to be processed at relatively low temperatures. Desirably, the molar-mass destribution ($M_w/M_n$) of the first cycloolefin copolymer is less than 2.

To avoid compositions wherein the use temperature is undesirably reduced, the second cycloolefin copolymer should have a glass transition temperature of greater than about 50° C., with the proviso that the glass temperature of the second cycloolefin copolymer is at least 25° C. lower than the glass transition temperature of the first cycloolefin copolymer. In the practice of this invention it is of particular interest to employ as the second cycloolefin copolymer a copolymer having a glass transition temperature of from about 55° C. to about 85° C., more particularly, from about 55° C. to about 70° C.; however copolymers having higher glass transition temperatures can be employed as the second cycloolefin copolymer when the first cycloolefin copolymer has a higher glass transition temperature, for example, a glass transition temperature in excess of 185° C., and higher use temperatures are desired. In many applications requiring high temperature capability, for example information storage base boards, precision lenses, light guides, and the like, it is desirable to maintain a Tg of at least about 130° C. in the resulting composition.

The preparation of cycloolefin copolymers is well known in the art and is described, for example, in U.S. Pat. Nos. 4,874,808 and 5,439,722, the disclosures of which are incorporated herein by reference. The cycloolefin copolymers may be produced at temperatures from −78° C. to 200° C. and pressures from 0.01 to 200 bar with one or more catalyst systems which contain at least one transition metal compound and, if necessary, a co-catalyst and, if necessary, a substrate material. Metallocenes are well suited for use as such transition metal compounds. Cycloolefin copolymers and catalyst systems, which may used in the preparation thereof are described, for example, in U.S. Pat. Nos. 5,008,356; 5,087,677; 5,371,158; and 5,324,801.

To reduce hazing and maximize compatibility, it is desirable that the first and second cycloolefin copolymers be derived from cycloolefin starting materials that are substantially the same chemically. For example, when the first cycloolefin copolymer is derived from ethylene and norbornene, it is preferred that the second cycloolefin copolymer also be derived from ethylene and norbornene. It is furthermore advantageous for miscibility that the production of each cyclic olefin results in similar distribution of polyethylene and polynorbornene blocks, achieved typically through the use of same or similar catalysts.

The second cycloolefin copolymer is present in the compositions of this invention in an amount up to about 10% by weight, based on the total weight of of the composition. In the practice of this invention, compositions that contain the second cycloolefin copolymer in amounts of from about 0.5 to about 5 percent by weight, more particularly from about 2 to about 5 weight percent, based on the total weight of the composition, are of particular interest.

The fatty acid esters suitable for use in the practice of this invention are fatty acid esters of aliphatic polyhydric alcohols. Such fatty acid esters are preferably those which are obtained by reaction between a saturated natural or synthetic fatty acid and a polyhydric alcohol having at least three hydroxyl groups, such as to partially or completely esterify the hydroxyl groups of the polyhydric alcohol. Exemplary of such fatty acids are $C_{12}$ to $C_{50}$ fatty acids such as, for example, lauric acid, myristic acid palmitic acid, stearic acid, arachidic acid, behenic acid, oleic acid and the like, with $C_{12}$ to $C_{22}$ fatty acids being of particular interest. The subject fatty acids may be derived from the reaction of mixtures of such fatty acids and aliphatic polyhydric alcohols. Exemplary of suitable polyhydric alcohols are glycerol, diglycerol, pentaerythritol, sorbitol, and the like, and mixtures thereof. Included among the suitable fatty acid esters are, for example, glycerol monolaurate, glycerol monostearate, glycerol distearate, pentaerythritol distearate, pentaerythritol tetrastearate, sorbitol monolaurate, sorbitol monostearate, and the like, and mixtures thereof. Preferred fatty acid esters are fatty acid esters of pentaerythritol, more particularly pentaerythritol tetrastearate and pentaerythritol distearate. Fatty acid esters are commercially available from numerous suppliers and include, for example, products available from Lonaz Inc. under the tradenames Glycolube® P and Glycolube® 155. The fatty acid esters are generally present in the subject compositions in amounts of from about 0.01 to about 3 percent by weight, preferably from about 0.05 to about 1.5 percent by weight, and most preferably from about 0.1 to about 0.5 percent by weight, based on the total weight of the composition.

By combining the cycloolefin copolymer and fatty acid ester components in the amounts described above. it has now been found possible to provide compositions having a Hunter b color value of less than 1.0, preferably less than 0.8. In certain preferred embodiments, the combination of the subject polyolefin and fatty acid ester components provides compositions having an essentially colorless or "water white" appearance when fabricated into molded parts.

If desired, the subject compositions may contain one or more additional optional additives such as, for example, antioxidants, stabilizers, and the like, provided that such additives do not undesirably affect the optical properties of the composition. Antioxidants suitable for use in the subject compositions include but are not limited to phenolic, phosphite, phosphonite and lactone antioxidantants and combinations thereof. The following, are examples of some of the antioxidants suitable for use in this invention: tetrakis-[methylene(3,5-di-tert-butyl-4-hydroxyphenyl)propionate] methane; octadecyl 3,5-di-tert-butyl-r-hydroxyhydrocinnamate, tris(2,4-di-tert-butylphenyl) phosphite, and the like. When present, the total amount of such additional optional additives typically does not exceed about 1% by weight of the total weight of the composition. More typically, when present, the total amount of such additional optional additives is from about 0.1 to about 0.5% by weight, based on the total weight of the composition.

The addition of metal salts, for example, metal salts of fatty acids, e.g., zinc stearate, may discolor the resulting composition. It is, therefore, desirable that the composition be substantially free of such additives.

The compositions may be prepared by conventional melt blending techniques wherein the cycloolefin copolymers, stabilizer and, when present, additional additives are combined under conditions of elevated temperature and shear. The order in which the various composition components are combined is not critical; if desired, the components can be combined in a single or multiple steps. Typically, the compositions are prepared by extrusion compounding of the components at melt temperatures of from about 240° C. to about 270° C., depending upon the particular components utilized and their relative amounts. Another method of preparation is the addition of all additives via solution during the polymer preparation. In this method, the stabilizers are solubilized in a suitable solution, and metered into the polymer/solvent mixture prior to final devolitalization and pelletizing. This method assures very uniform distribution of the components, specifically the distribution of the lower Tg cycloolefin throughout the higher Tg cycloolefin.

The compositions of this invention are useful in the production of molded precision optical articles including, for example, information storage media such as CD, DVD, CD-R, DVD-R, DVD-RW, DVD-R+W, DVD-RAM, lenses, optical display base boards, light enhancing plates, LEDs, mirrors, prisms, and light guides.

In an embodiment of particular interest this invention relates to a cycloolefin resin having a Hunter b color value of less than 0.8, which resin consists essentially of:

(a) a first cycloolefin copolymer having a glass transition temperature of from about 120° C. to about 160° C. and an intrinsic viscosity of from about 5 to about 1000 ml/g as measured in decalin at 135° C., (b) up to about 10% by weight, based on the total weight of the resin, of a second cycloolefin copolymer, said second cycloolefin copolymer a glass transition temperature of from about 55° C. up to about 85° C. and an intrinsic viscosity of from about 1 to about 500 ml/g as measured in decalin at 135° C., (c) from about 0.05 to about 1.5 percent by weight, based on the total weight of the resin, of at least one fatty acid ester of a polyhydric alcohol, and (d) and, optionally, up to about 1 percent by weight, based on the total weight of the resin, of an antioxidant.

EXAMPLES

The following examples are presented to further illustrate this invention. The examples are not, however, intended to limit the invention in any way. Unless otherwise indicated, all parts and percentages are by weight, based on total composition weight.

Resins were prepared by extrusion compounding the components listed in Table 1, in the amounts therein described, in a Werner and Pfleiderer twin screw co-rotating extruder, having a screw diameter of 30 mm. Melt temperature was maintained at approximately 260° C. Nitrogen was used over the feed section to minimize oxidative degradation. The resins were extruded, collected and pelletized.

Abbreviations used in Table 1 are as follows:

| | |
|---|---|
| COC 1 | Topas ® cycloolefin copolymer, grade 5013 (Tg 145° C.) available from Ticona, the engineering resins business of Celanese AG. |
| COC 2 | Topas ® cycloolefin copolymer, grade "TM", (Tg 65° C.), from Ticona, the engineering resins business of Celanese AG. |
| PETS | Pentaerythritol tetrastearate |
| PEDS | Pentaerythritol distearate |
| Znst | Zinc stearate |

The resins were molded into test specimens (2.5" (6.35 cm) diameter discs, ⅛" (0.32 cm) in thickness, molded using a full thickness edge gate; and/or 4" (10.16 cm) diameter discs, ⅛" (0.32 cm) in thickness, also molded using a full thickness edge gate). The 4" (10.16 cm) diameter discs were molded on a Demag NCIII injection molding machine having a capacity of 94 cubic centimeters and equipped with a general purpose screw having a screw diameter of 32 mm and a mold finished to SPE #1 quality. Molding conditions were as follows:

melt temperature: 240° C.

mold temperature: 120° C.

screw speed: 125 rpm cycle time: 40 seconds injection speed: 25 mm/sec

The 2.5" (6.35 cm) diameter discs were molded on an Arburg All-Rounder 220-110 injection molding machine having a capacity of 63 cubic centimeters and equipped with a general purpose screw having a screw diameter of 25 mm and a mold finished to SPE #1 quality. Molding conditions were as follows:

melt temperature: 240° C.

mold temperature: 120° C.

screw speed: 150 rpm cycle time: 30 seconds injection speed. 25 mm/sec

Splay was evaluated by visual examination of the 4" (10.16 cm) diameter discs, ⅛" (0.32 cm) thick. Splay data of the molded specimens is reported in Table 1.

Color was evaluated on a Macbeth Color-Eye CE7000 (Gratagmacbeth Co.) spectrophotometer, with L, a, and b values being measured according to ASTM method E1348 (illuminant D65; 10 degree observer) on the 2.5" (6.35 cm) diameter discs ⅛" (0.32 cm) thick, molded as described above, such procedure for evaluating color being herein referred to as the "Hunter Color Test Procedure. The spectrophotometer was also used to measure the yellowness index (YI) of the test specimens following the procedure of ASTM E313 (illuminant D65; 10 degree observer). Haze was measured on the same instrument by inserting the specimen in a container filled with the index matching fluid benzyl alcohol, such that the face of the specimen is completely wetted with the fluid. The reported haze values represent the subtraction of the value measured on the fluid filled sample holder, without the sample, from the same arrangement measured with the sample inserted. Hunter a, b and L values, as well as YI and haze data, of the molded specimens is reported in Table 2.

TABLE 1

| EXAMPLE | COMPONENT (WT. %) | | | | | |
|---|---|---|---|---|---|---|
| | COC 1 | COC 2 | PETS | PEDS | Znst | SPLAY DATA |
| $C_1$ | 100.0 | — | — | — | — | Whole surface shows splay. |
| $C_2$ | 97.5 | 2.5 | — | — | — | Splay on most of the surface. |
| $C_3$ | 99.9 | — | 0.1 | — | — | Splay on most of the surface. |
| $C_4$ | 97.45 | 2.5 | — | — | 0.05 | — |
| $C_5$ | 96.85 | 2.5 | — | 0.6 | 0.05 | — |
| $E_1$ | 97.4 | 2.5 | 0.1 | — | — | Much less splay compared to $C_1$ $C_2$ and $C_3$. |
| $E_2$ | 97.5 | 2.5 | — | 0.1 | — | — |

TABLE 2

| | | | HUNTER COLOR VALUE | | |
|---|---|---|---|---|---|
| COMPOSITION | YI | HAZE (%) | L | A | b |
| $C_4$ | 1.83 | 0.484 | 95.58 | −0.18 | 1.28 |
| $C_5$ | 1.71 | 0.48 | 95.18 | −0.13 | 1.14 |
| $E_1$ | 0.94 | 0.001 | 96.28 | −0.1 | 0.7 |
| $E_2$ | 0.93 | 0.001 | 96.19 | −0.08 | 0.7 |

What is claimed is:

1. A cycloolefin copolymer resin having a Hunter b color value of less than 1.0, which resin comprises:

a) first cycloolefin copolymer having a glass transition temperature of from about 100° C. to about 220° C., an intrinsic viscosity of from about 5 to about 1000 ml/g as measured in decalin at 135° C., and a molar-mass distribution ($M_w/M_n$) of less than 2, b) from about 0.5 to about 10% by weight, based on the total weight of the resin, of a second cycloolefin copolymer, said second cycloolefin copolymer having a glass transition temperature of greater than about 50° C. and an intrinsic viscosity of from about 1 to about 500 ml/g as measured in decalin at 135° C., and c) from about 0.01% to about 3%, based on the total weight of the resin, of at least one lubricant selected from the group consisting of fatty acid esters of aliphatic polyhydric alcohols, with the proviso that the glass temperature of the second cycloolefin copolymer is at least 25° C. lower than the glass transition temperature of the first cycloolefin copolymer and wherein the resin is substantially free of zinc stearate.

2. A resin as described in claim 1 wherein said first and second cycloolefin copolymers are random copolymers comprising units derived from (a) at least one cycloolefin selected from the group consisting of:

(I)

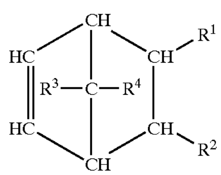

(II)

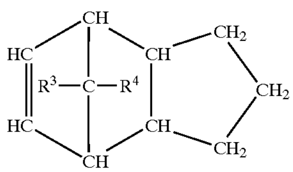

(III)

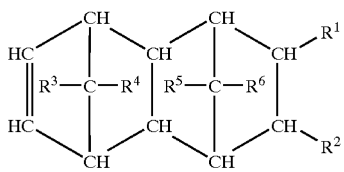

(IV)

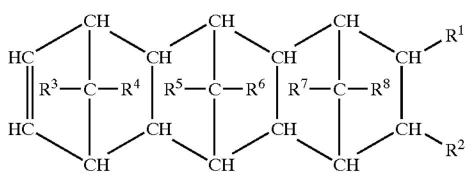

(V)

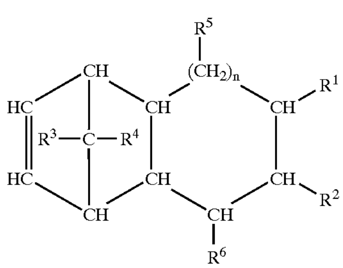

and (VI)

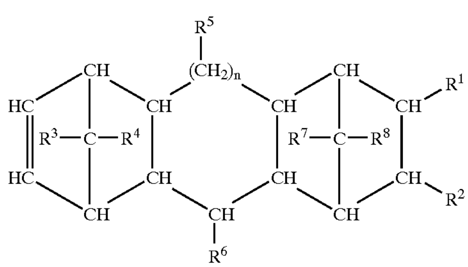

wherein $R^1$, $R^2$, $R^3$, $R^4$, $R^5$, $R^6$, $R^7$, and $R^8$ are independently selected from the group consisting of hydrogen, $C_1$ to $C_{20}$ alkyl groups, $C_6$ to $C_{20}$ aryl groups, F, Cl, Br, and I, and n is an integer having a value from 0 to 5; (b) a non-cyclic 1-olefin of the formula:

(VII)

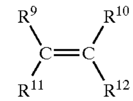

wherein $R^9$ to $R^{12}$ are independently selected form the group consisting of hydrogen and $C_1$ to $C_8$ alkyl groups; and, optionally, (c) a cycloolefin of the formula:

(VIII)

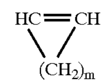

wherein m is an integer having a value from 2 to 10.

3. A resin as described in claim 2 wherein said second cycloolefin copolymer is present in an amount of from about 0.5 to about 5 weight percent, based on the total weight of the resin and said lubricant is present in an amount of from about 0.05 to about 1.5 percent by weight, based on the total weight of the resin.

4. A resin as described in claim 3 wherein said first cycloolefin copolymer has a Tg of from about 100° C. to about 185° C. and said second cycloolefin copolymer has a Tg of from about 55° C. to about 70° C.

5. A resin as described in claim 4 wherein said first and second cycloolefin copolymers comprise units derived from ethylene and a cycloolefin of the formula:

(I)

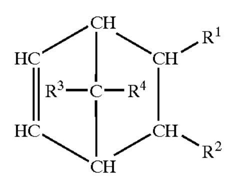

6. A resin as defined in claim 1 having a Hunter b color value of less than 0.8.

7. A resin as defined in claim 1 wherein said lubricant is selected form the group consisting of pentaerythritol tetrastearate, pentaerythritol distearate, and mixtures thereof.

8. A resin as defined in claim 7 wherein said lubricant is pentaerythritol tetrastearate.

9. A cycloolefin resin having a Hunter b color value of less than 0.8, which resin consists essentially of:

(a) a first cycloolefin copolymer having a glass transition temperature of from about 120° C. to about 160° C., an intrinsic viscosity of from about 5 to about 1000 ml/g as measured in decalin at 135° C., and a molar-mass distribution ($M_w/M_n$) of less than 2, (b) from about 0.5 to about 10% by weight, based on the total weight of the resin, of a second cycloolefin copolymer, said second cycloolefin copolymer having a glass transition temperature of from about 55° C. to about 85° C. and an intrinsic viscosity of from about 1 to about 500 ml/g as measured in decalin at 135° C., (c) from about 0.05 to about 1.5 percent by weight, based on the total weight of the resin, of at least one fatty ester of a polyhydric alcohol, and (d) optionally, up to about 1 percent by weight, based on the total weight of the resin of an antioxidant, wherein the resin is substantially free of zinc stearate.

10. A resin as described in claim 9 wherein said second cycloolefin copolymer has a Tg of from about 55° C. to about 70° C.

11. A resin as described in claim 10 wherein said second cycloolefin copolymer is present in an amount of from about 0.5 to about 5 weight percent, based on the total weight of the resin.

12. A resin as described in claim 10 wherein said first and second cycloolefin copolymers are derived from cycloolefin starting materials that are substantially the same chemically.

13. A resin as described in claim 12 wherein said first and second cycloolefin copolymers are derived from ethylene and norbornene.

14. A resin as described in claim 9 which is substantially free of metal salts of fatty acids.

15. A resin as described in claim 12 wherein said lubricant is present in an amount of from about 0.1 to about 0.5 percent by weight, based on the total weight of the resin.

16. A resin as described in claim 12 wherein said antioxidant comprises at least one phenolic antioxidant.

17. A resin as described in claim 9 wherein said first and second cycloolefin copolymers are random copolymers comprising units derived from ethylene and a at least one cycloolefin selected from the group consisting of:

(I)

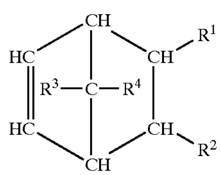

(II)

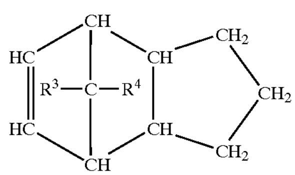

(III)

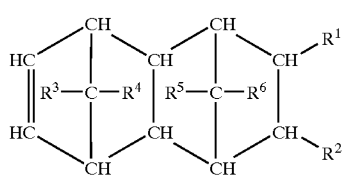

-continued (IV)

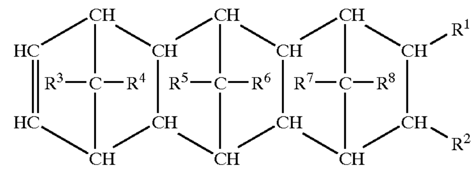

(V)

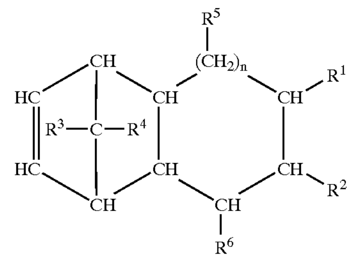

and (VI)

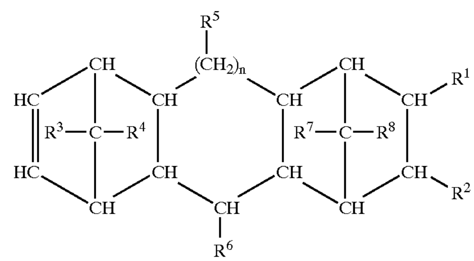

wherein $R^1$, $R^2$, $R^3$, $R^4$, $R^5$, $R^6$, $R^7$, and $R^8$ are independently selected from the group consisting of hydrogen, $C_1$ to $C_{20}$ alkyl groups, $C_6$ to $C_{20}$ aryl groups, F, Cl, Br, and I, and n is an integer having a value from 0 to 5.

18. A molded article for optical applications that is formed from the resin of claim 1.

* * * * *